United States Patent [19]

Romweber et al.

[11] Patent Number: 5,116,363
[45] Date of Patent: May 26, 1992

[54] METHOD AND APPARATUS FOR CONDITIONING REFUSE

[76] Inventors: Frank T. Romweber, P.O. Box 95, Olympia Fields, Ill. 60461; Dennis F. Sowa, 321 Montclare La., Wood Dale, Ill. 60191

[21] Appl. No.: 698,355

[22] Filed: May 6, 1991

Related U.S. Application Data

[63] Continuation-in-part of Ser. No. 475,995, Feb. 26, 1990, abandoned, which is a continuation-in-part of Ser. No. 410,093, Sep. 20, 1989, abandoned.

[51] Int. Cl.⁵ ............................................. F26B 3/00
[52] U.S. Cl. .................................... 34/22; 34/136; 34/137; 432/105; 110/245; 422/26
[58] Field of Search ............... 34/136, 137, 22, 12; 110/226, 224, 227, 228, 246; 432/224, 225, 105, 113, 114, 346; 422/26, 38

[56] References Cited

U.S. PATENT DOCUMENTS

| | | | |
|---|---|---|---|
| 1,545,055 | 7/1925 | Lindhard | 34/137 |
| 4,063,903 | 12/1977 | Beningson et al. | |
| 4,359,005 | 11/1982 | Baston | 110/245 |
| 4,427,376 | 1/1984 | Etnyre et al. | 432/105 |
| 4,459,921 | 7/1984 | Unger | 110/226 |
| 4,474,119 | 10/1984 | Jones | 110/245 |
| 4,476,790 | 10/1984 | Borio et al. | 110/245 |
| 4,477,984 | 10/1984 | Wenger | 432/105 |
| 4,601,115 | 7/1986 | Draper et al. | 34/137 |
| 4,656,955 | 4/1987 | Kuo | 110/224 |
| 4,658,736 | 4/1987 | Walter | 110/346 |
| 4,840,129 | 6/1989 | Jelinek | 110/226 |

Primary Examiner—Henry A. Bennet
Assistant Examiner—Denise L. F. Gromada
Attorney, Agent, or Firm—McAndrews, Held & Malloy, Ltd.

[57] ABSTRACT

A method and apparatus for treating refuse by non-combustibly shrinking polyfoam plastics in the refuse. The trash is heated at a temperature between 250° F. and 500° F. for a minimum period of time. A rotatable chamber heats the refuse and transports the refuse for the minimum period of time. An operator controls the rate of rotation of the chamber and thus the time of heating in accordance with the moisture content of the refuse. A steam/air mixture used as a heat medium serves to kill bacteria in the refuse in addition to shrinking and drying the refuse.

40 Claims, 4 Drawing Sheets

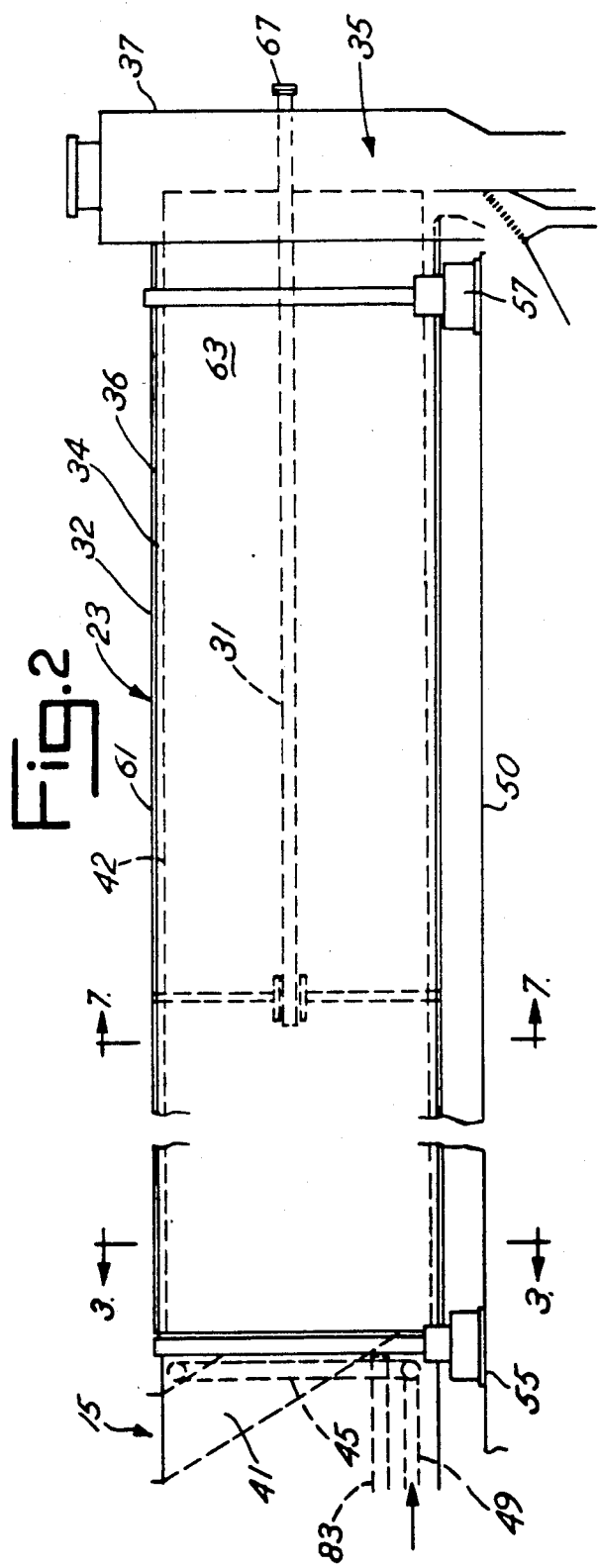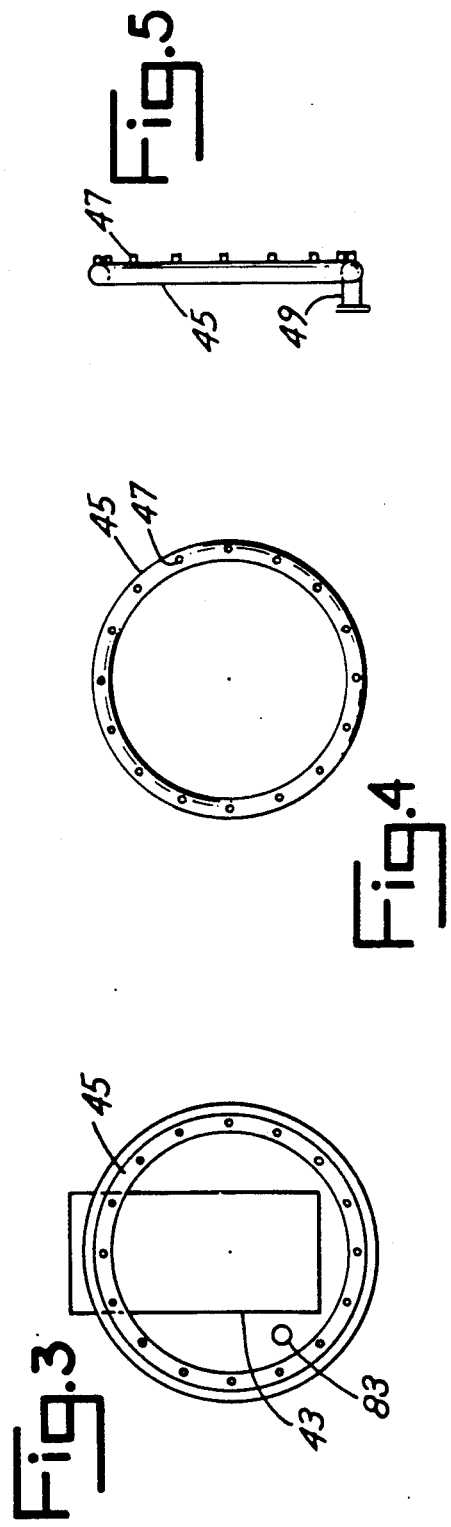

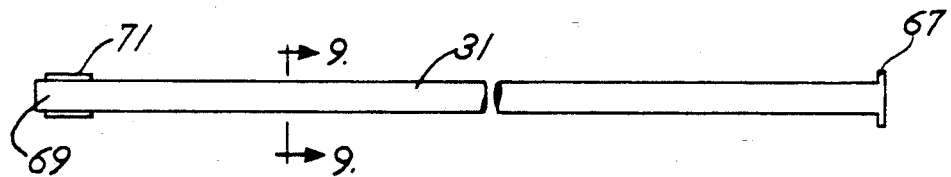
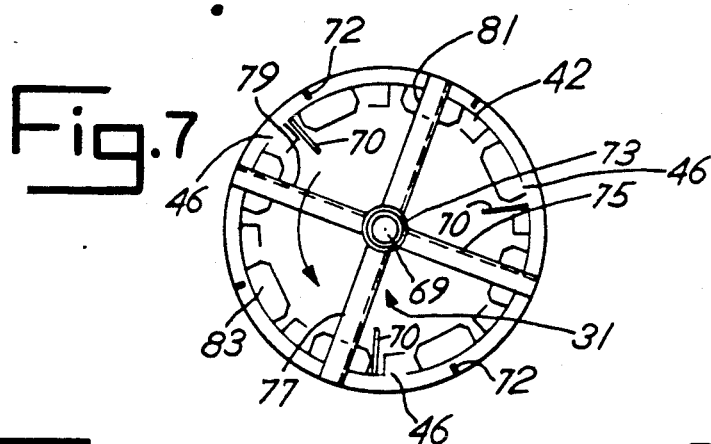
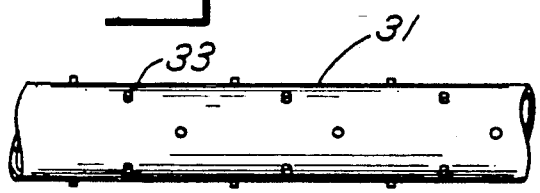
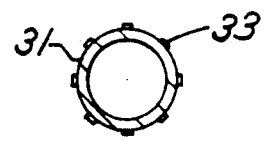
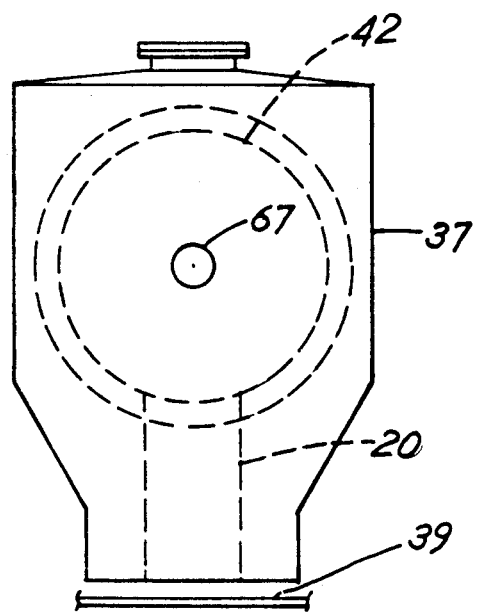

METHOD AND APPARATUS FOR CONDITIONING REFUSE

RELATED APPLICATIONS

This application is a continuation-in-part of U.S. patent application, Ser. No. 07/475,995, filed Feb. 6, 1990 and entitled METHOD AND APPARATUS FOR CONDITIONING REFUSE which application itself is a continuation-in-part of U.S. patent application, Ser. No. 07/410,093, filed Sept. 20, 1989 now abandoned and entitled METHOD AND APPARATUS FOR CONDITIONING REFUSE.

Both of these related applications are incorporated herein by reference.

BACKGROUND OF THE INVENTION

The invention relates to the disposal/treatment of refuse in the form of solid waste material, and more particularly to a method and apparatus for conditioning refuse by the noncombustible shrinking of polyfoam plastic material as one stage in the refuse disposal process.

Over the past 10 years, the quantity and character of household refuse and fast food refuse has changed measurably. The amount of trash generated has increased per person per day and the population has increased by some 30 million people. It is believed that the daily amount of trash for disposal in 1980 has increased by about forty percent (40%), while available disposal space has been decreasing.

The comingled household waste of today contains a very large percentage more of plastics and aluminum than household waste did 10 years ago. The methods for disposal include landfills, incineration and household separation of certain recyclable items with separate pickup for each item being necessary. All three methods are becoming increasingly expensive. In addition, it is very difficult to recycle recyclables in inner city trash by existing methods.

It is particularly desireable to have a method for disposing of and recycling certain municipal solid wastes both safely and economically and in a manner that does not harm the environment. Wastes from various sources including households, fast food restaurants, and other commercial establishments including airports, sports arenas and other businesses contain cups and dishes made from polyfoam plastic material. The burning of such polyfoam plastics poses direct problems to the environment from the resulting exhaust gases. In addition, the dumping of such materials at land storage locations also effects the environment in that such plastics are not generally biodegradable and occupy an inordinately greater volume.

It is therefore an object of the present invention to optimize the recycling of certain municipal solid wastes safely and economically without harming the environment.

It is a further object of the present invention to provide a method and apparatus for the disposal of polyfoam plastic type material including foam cups, dishes and containers.

It is a further object of the present invention to provide a method and apparatus for preprocessing of polyfoam plastic materials such as foam cups and dishes in order to prepare the refuse for a subsequent sorting processes of recyclable and objectionable inorganics.

It is an additional object of the present invention to provide a conditioning stage in a waste disposal system which may be included within presently existing solid waste disposable facilities.

It is a further object of the present invention to optimize the recovery of aluminum, steel, plastic, glass, textiles and waste paper by treating the refuse before sorting.

It is an additional object of the present invention to have a method for shrinking polyfoam plastic materials, thus requiring far less volume for an eventual disposal site or for separation and recycling.

It is a further object of the present invention to shrink noncombustibly large volumes of polyfoam material quickly and safely in order to prepare the material for recycling.

SUMMARY OF THE INVENTION

These and other objects of the invention are achieved in a method and apparatus wherein refuse including polyfoam plastics is heated at a temperature of between $250°$ and $500°$ for a minimum period of time, causing non-combustible shrinking of the polyfoam plastics.

One of the disclosed embodiments causes the drying and sanitizing of the refuse stream in general, and the trash is separated with objects 6 inches and smaller being drawn off separately for easier recycling

BRIEF DESCRIPTION OF THE DRAWINGS

FIG. 2 is a partial side view of the refuse conditioner of FIG. 1.

FIG. 3 is a view taken along a section 3—3 of the conditioner of FIG. 2.

FIG. 4 is a front view of a nozzle ring of the conditioner of FIG. 2.

FIG. 5 is a side view of the nozzle ring of FIG. 4.

FIG. 6 is a side view of an injection tube of the conditioner of FIG. 2.

FIG. 7 is an end view taken along a section 7—7 of the conditioner of FIG. 2.

FIG. 8 is an enlarged side view of a portion of the injection tube of FIG. 6.

FIG. 9 is an enlarged end view of the injection tube of FIG. 6.

FIG. 10 is an end view of a drop out box of the conditioner of FIG. 2.

DETAILED DESCRIPTION OF THE PREFERRED EMBODIMENT

Figure 1:
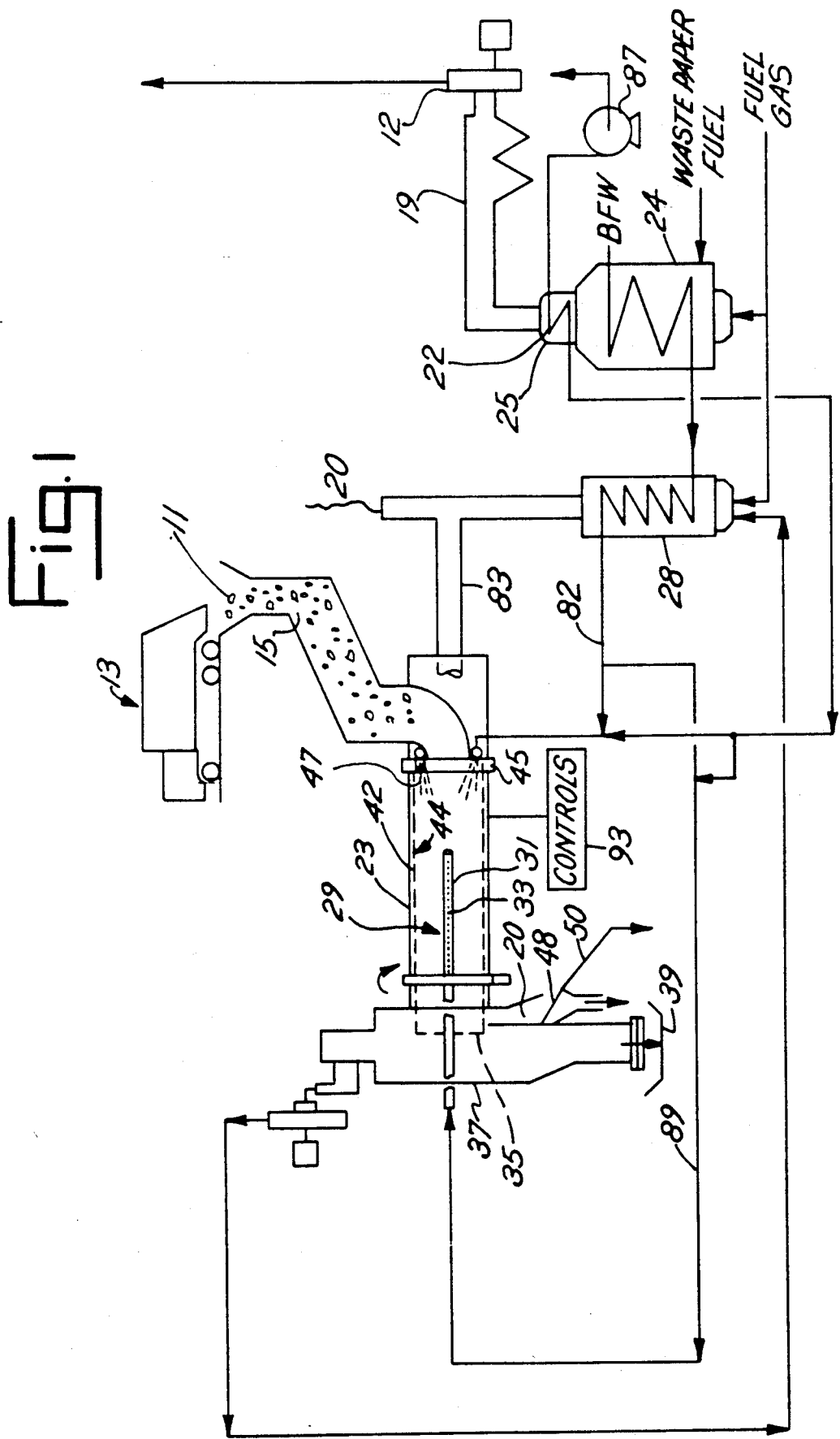
FIG. 1 is a flow diagram of a system using a preferred embodiment of the refuse conditioner of the present invention.

Referring to FIG. 1, municipal, commercial, household and or fast food solid waste 11 is collected by a truck 13, or by other means. The waste is culled of large objects such as old appliances, hot water heaters, tree stumps, yard wastes, etc., and then dumped into a refuse inlet passage 15, breaking the baled waste prior to entering the inlet passage.

It is not necessary to presort raw refuse such that only polyfoam plastic materials enter inlet passage 15. The raw refuse in its "as is", unsorted state is fed into inlet passage 15. The input refuse is not shredded or otherwise processed prior to input. The present system is tolerant of handling all household wastes in addition to polyfoam plastics without harm to the environment. "Polyfoam plastic" as used herein shall mean plastic having gaseous bubbles randomly trapped within the plastic.

A rotating conditioning chamber 23 receives the solid waste from inlet passage 15 and heats the waste for rapid drying and shrinking of polyfoam plastic materials. Such items as foam cups and foam trays shrink to 1/5 of their initial size. The refuse moves through the conditioner chamber 23 at a rate which may be controlled in accordance with the moisture content of the trash.

A hot air heater 25 forces hot air gas (subsequently mixed with steam) into chamber 23. Air is drawn through a compressor 87 and is forced by the compressor into the hot air heater 25 and then forced into chamber 23. A steam The temperature of the gas at the inlet to chamber 23 will range from 250° F. to 550° F. The mixture of superheated steam and hot compressed air serves to kill bacteria inherent in the refuse in addition to shrinking and drying of the refuse. The steam will carry more BTU's of heat than the air, as understood.

Midway through the conditioning chamber 23, the refuse is exposed to a second stage reheater, generally indicated by reference numeral 29. Part of the air discharged from compressor 87 is heated to about 500° F. in a convection bank 22, merged with line steam and discharged back through line 89 to the second stage reheater 29 and into chamber 23.

Reheater 29 is formed from a distribution pipe 31 disposed along the longitudinal axis of chamber 23. Located on the outer surface of pipe 31 is a plurality of directional nozzles 33 through which the hot gas is discharged.

Chamber 23 rotates about its longitudinal axis tumbling the refuse and causing the refuse to move through the longitudinal length of the chamber. Distribution pipe 31 does not rotate with chamber 23.

Chamber 23 also contains a perforated inner liner 42. Liner 42 includes three inch holes 44, each spaced approximately five inches from their centers and covering the entire surface of liner 42. In addition, slots 46 (about 6 inches by 18 inches) are cut in liner 42 along the face of lifters 70 (described hereinafter in reference to FIG. 7). As chamber 23 rotates, materials 6 inches and smaller is scoped through the holes 44 and slots 46.

The refuse passes through chamber 23 and exits an outlet 35 into a dropout box 37. The refuse cools rapidly and is conveyed by a mechanical conveyor 39, as for example moving belts, which can be used to convey the refuse to a mechanical classifier (not shown) or a hand picking line (not shown) where glass, ferric, aluminum, large plastic items textiles, and paper are sorted and sent to respective areas for recycling or disposal. The paper can further be separated into various classifications for baling and shipment or used for fuel for generating steam.

The small sized refuse that passes through inner liner 42 falls into grit box 20. Fine materials, such as food and other organics, grit, shrunken foam, shards of glass, etc., fall through a vibrating screen 48 or similar sorting device, and are then disposed of in a landfill or compost system. The larger items which fall into grit box 20 and do not pass through screen 48, such as soft drink cans, glass jars, shrunken plastic bottles, etc., move onto a moving belt 50. Belt 50 may form a picking line or transfer the items to a mechanical sorter for recovery and recycling of the items.

Referring now to FIG. 2, inlet passage 15 includes a slanted guideway 41 which leads into a rectangular entrance 43 of the chamber, shown more particularly in FIG. 3. A primary hot gas nozzle ring 45 is disposed at the entry end of chamber 23. As shown in FIGS. 3, 4 and 5, ring 45 is formed from a circular hollow pipe through which the hot air/steam gas is forced. A plurality of nozzles 47 communicate the interior of ring 45 with the interior of chamber 23. Hot gas is forced into ring 45 via a stem pipe 49 and then expelled through nozzles 47. The nozzles are directed facing into the rotating chamber from the front thereof.

Figure 11:
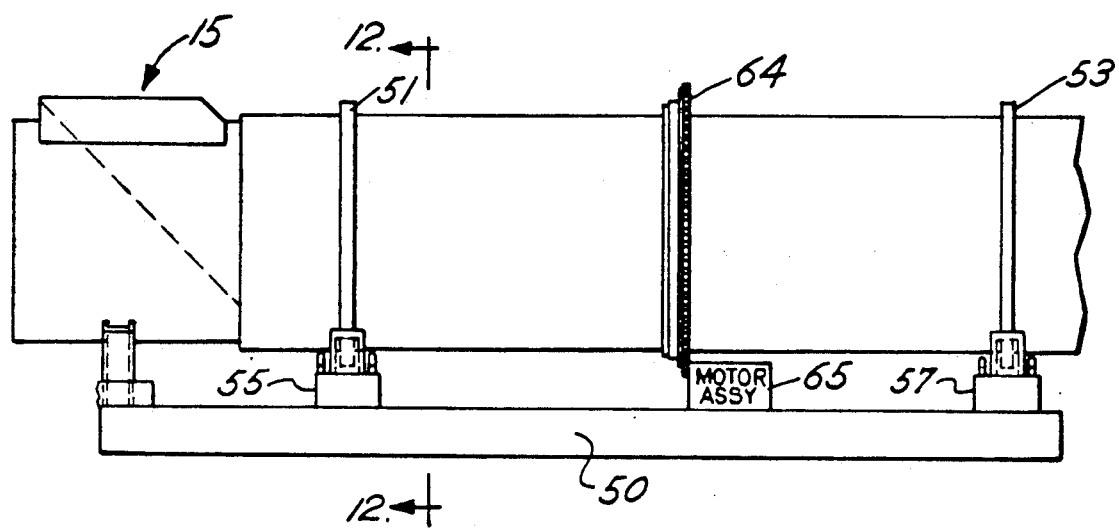
FIG. 11 is a side view of the conditioner of FIG. 1.
Figure 12:
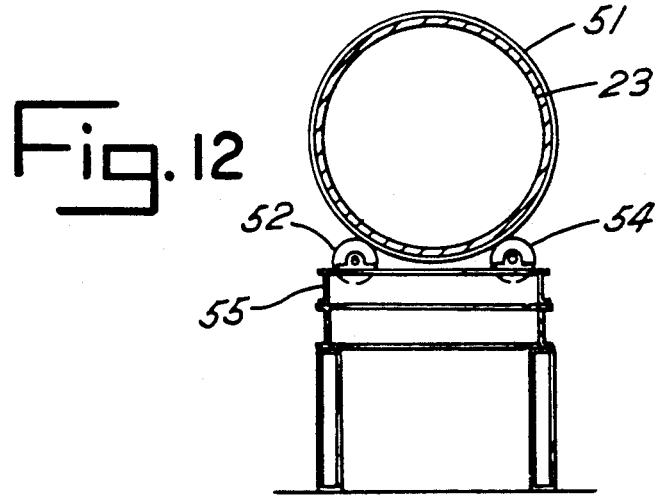
FIG. 12 is a view taken along section 12—12 of the conditioner of FIG. 11.

As shown in FIG. 2, chamber 23 is supported above the ground or horizontal 50 by a plurality of support legs 55,57. As shown more particularly in FIGS. 11, 12, support legs 55,57 support bearing surfaces 51,53 on which the chamber rotates. In addition, drop out box 37 (FIG. 2) includes a circular bearing (not shown) which receives the chamber permitting its rotation relative to the drop out box. As shown in FIG. 12, legs 55, 57 include rollers 52,54 which turn relative to the legs during rotation of the chamber.

A motor assembly 65 is secured to the horizontal 50 and engages a sprocket gear 64, positioned at the central portion of the rotating drum, for causing its continual rotation. As shown in FIG. 2, cylinder 23 is formed of an outer skin 32 and an inner skin 34, between which insulation 36 is disposed. Perforated inner liner 42 (FIG. 2) is positioned uniformly inside the conditioning chamber and extends into dropout box 37 and over the top of grit box 20. Refuse which does not fall through inner liner 42 exits the chamber into dropout box 37. Inner liner 42 rotates together with chamber 23.

As shown in FIG. 2, distribution pipe 31 is located along the longitudinal axis of chamber 23. Pipe 3 lies within the majority of the central portion 61 of drum 23 and extends through dropbox 37. As shown in FIG. 6, distribution pipe 31 includes a coupling end 67 and a wear end 69. A wearplate 71 is formed around the outer perimeter of tube 31 at the wear end 69.

As shown in FIG. 7, wear end 69 of tube 31 rotates within a support ring 73 which is fixed with respect to chamber 23 by four support arms 75,77,79,81. As chamber 23 rotates, support arms 75-81 and support ring 73 rotate relative to distribution pipe 31. As shown in FIGS. 8 and 9, directional nozzles 33 are positioned around the circumference of tube 31 for providing forced hot gas within chamber 23. End 69 of tube 31 is closed so that hot gas is forced only from nozzles 33.

Referring again to FIG. 7, a plurality of flute elements 83, formed of flat metal plates are secured to the inner perforated liner of rotating drum 23 in an auger-type arrangement. Flute elements 83 serve to transport the refuse from entrance 43 of the chamber to its outlet 35. Flute elements 72 formed of flat metal plates (4 inches by 12 inches) are also located below the perforated liner 42 and attached to the inner skin 3, to convey the material out of the conditioner quickly. The flate plates 72 are positioned in an auger arrangement on the inner skin. Lifters 70 formed of flat metal plates (6 foot by 1 foot) are also mounted longitudinally in a staggered arrangement around the circumference of the perforated liner 42. Lifters 70 serve to lift and tumble the trash for better contact with the hot air/steam. Slots 46 are located at the base of the lifters 70 where the lifter meets the liner 42.

Drop out box 37 is located at the outlet of chamber 23. Waste is moved into the dropout box and falls by gravity into the bottom section thereof conveyor 39 is located at the bottom of dropout box 37 and serves to convey the removed refuse to the next processing section (not shown). The hot air gasses being forced through chamber 23 are led out of the top of drop out box 37 through steam superheater 28(FIG. 1) to the hot air stack 27 to the atmosphere at 20 or to chamber 23 via duct 88.

Rotational controls 93, as shown in FIG. 1, are manually controllable by the operator for controlling the motor assembly 65 for establishing the rat at which chamber 23 rotates. The flutes within chamber 23 establish the rate at which refuse is generally moved through the chamber from its entrance to its exit ends. By changing the rate of rotation, the operator can establish the amount of time that the refuse is within rotating chamber 23 and, thus, the amount of time that heat is applied to the refuse. Where the refuse has a good deal of moisture, the operator can slow the rotating drum down to ensure that the refuse is properly treated. The polyfoam plastic materials move through chamber 23 in less than ten minutes. This may be slowed, as discussed, by the operator, but the heating time will generally be less than ten minutes.

From the above description it can be seen that refuse including household bags of trash are fed into rotating chamber 23. No attempt is made to shred the trash by mechanical or other means. Jets of hot air and superheated steam contact the refuse including bagged garbage and the bags may open or be disintegrated by the steam contact. Polystyrene and other polyfoam materials are shrunk in size by controlled convective heat. Material six inches and smaller is filtered out. Glass and plastics are contacted with superheated steam making their subsequent removal and sorting much easier and more sanitary.

While preferred embodiments of the invention have been described hereinabove, those of ordinary skill in the art will recognize that the embodiments may be modified and altered without departing from the central spirit and scope of the invention.

What is claimed is:

1. A method of preprocessing raw trash for subsequent sorting, the trash having polyfoam plastic, paper, aluminum, glass and other types of refuse, using a movable chamber, comprising:
   inputting trash into the moveable chamber;
   heating the environment within the chamber to a temperature of between 250° F. and 500° F., said heating including non-combustibly shrinking the polyfoam plastic of the trash;
   moving the trash within the chamber for a time period during said step of heating;
   filtering out portions of a predetermined size or less of the trash during movement of the trash within the chamber; and
   recovering the remaining larger portions of the trash for subsequent processing.

2. A method according to claim 1 wherein said step of heating includes controlled convective heating of said raw trash.

3. A method according to claim 1 wherein said step of filtering includes filtering out portions of the trash sized approximately six inches and smaller.

4. A method according to claim 1 wherein said step of heating includes drying and sanitizing the raw trash.

5. A method according to claim 1 and further including the step of hand sorting said recovered larger portions of the raw trash.

6. A method according to claim 1 and further including the step of removing a portion of the raw trash prior to the step of inputting to rid the trash of very large objects.

7. A method according to claim 1 wherein said step of heating includes the step of controlling said period of time by varying the rate of movement of the trash.

8. A method according to claim 1 wherein said step of heating includes forcing superheated steam within the chamber and in contact with the trash.

9. A method according to claim 1 wherein said step of heating includes forcing superheated steam mixed with hot air into the chamber and in contact with the trash.

10. A method according to claim 1 wherein said step of moving includes rotating the chamber.

11. A method according to claim 1 wherein the chamber is elongated in one direction and wherein said step of moving includes moving the trash along the longitudinal direction of the chamber.

12. A method according to claim 1 and further including the step of sorting the remaining larger portions of the trash which are recovered.

13. A method according to claim 1 wherein said step of moving includes lifting and tumbling of the trash.

14. A method according to claim 1 wherein said step of inputting includes feeding household bags of trash into the chamber; and further including the step of opening the bags by contacting the bags with superheated steam.

15. A method according to claim 1 and further including directing the filtered portions of the trash of a predetermined size or less, for subsequent disposal or recycling.

16. A method according to claim 1 wherein said step of recovering includes separately exiting of the remaining larger portions of the trash from the chamber.

17. A method according to claim 16 wherein said step of moving includes continually moving the trash from the point of its input into the chamber to the point of its exit from the chamber.

18. A method according to claim 1 wherein said step of moving includes continually moving the trash.

19. A method according to claim 18 wherein said step of continually moving the trash includes the step of rotatingly agitating the trash.

20. A method of treating trash having polyfoam plastic, paper, aluminum, glass and other types of refuse, using a movable chamber, comprising:
   inputting trash into the moveable chamber;
   heating the environment within the chamber to a temperature of between 250° F. and 500° F., said heating including non-combustibly shrinking the polyfoam plastic of the trash;
   moving the trash within the chamber for a time period during said step of heating;
   forcing steam into the chamber and in contact with the trash; and
   outputting trash from the moveable chamber for subsequent processing.

21. A method according to claim 20 wherein said step of forcing steam includes forcing superheated steam into the chamber and in contact with the trash.

22. A method according to claim 20 wherein said step of moving includes rotating the chamber.

23. A method according to claim 20 wherein the chamber is elongated in one direction and wherein said step of moving includes moving the trash along the longitudinal direction of the chamber.

24. A method according to claim 20 wherein said step of moving includes continually moving the trash from the point of its input into the chamber to the point of its output from the chamber.

25. A method according to claim 20 and further including the step of sorting of trash outputted from the chamber.

26. A method according to claim 20 wherein said step of moving includes lifting and tumbling of said trash.

27. A method according to claim 20 wherein said step of inputting includes feeding household bags of trash into the chamber; and further including the step of opening the bags by contacting the bags with superheated steam.

28. A method according to claim 20 wherein said step of heating includes the step of controlling said period of time by varying the rate of movement of the trash.

29. A method according to claim 20 wherein said step of heating includes drying and sanitizing the raw trash.

30. A method according to claim 20 and further including the step of hand sorting of the outputted trash.

31. A method according to claim 20 and further including the step of removing a portion of the trash prior to the step of inputting to rid the trash of objects larger than the sizes of the objects inputted.

32. A method according to claim 20 wherein said step of heating includes controlled convective heating of said raw trash.

33. A method according to claim 32 wherein said step of heating includes forcing hot air into the chamber.

34. A method according to claim 33 wherein said step of heating includes mixing of the hot air with the steam.

35. A method according to claim 20 and further including the step of filtering out portions of the trash of a predetermined size or less during the movement of the trash within the chamber.

36. A method according to claim 35 wherein said step of outputting trash includes separately exiting the remaining portions of trash being larger than the filtered out portions of a predetermined size or less, for subsequent processing.

37. A method according to claim 35 and further including directing the filtered portion of trash of predetermined size or less, for subsequent disposal or recycling.

38. A method according to claim 35 wherein said step of filtering includes filtering out portions of the trash sized approximately six inches and smaller.

39. A method according to claim 20 wherein said step of moving includes continually moving the trash.

40. A method according to claim 39 wherein said step of continually moving the trash includes the step of rotatingly agitating the trash.

* * * * *